United States Patent
Tanabe

(10) Patent No.: US 9,127,145 B2
(45) Date of Patent: Sep. 8, 2015

(54) RUBBER COMPOSITION AND PNEUMATIC TIRE USING SAME

(71) Applicant: THE YOKOHAMA RUBBER CO., LTD., Minato-Ku, Tokyo (JP)

(72) Inventor: Yusuke Tanabe, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/385,803

(22) PCT Filed: Mar. 19, 2013

(86) PCT No.: PCT/JP2013/057820
§ 371 (c)(1),
(2) Date: Sep. 17, 2014

(87) PCT Pub. No.: WO2013/141240
PCT Pub. Date: Sep. 26, 2013

(65) Prior Publication Data
US 2015/0111985 A1   Apr. 23, 2015

(30) Foreign Application Priority Data

Mar. 19, 2012 (JP) ................. 2012-061392
Oct. 5, 2012 (JP) ................. 2012-223219

(51) Int. Cl.
| | |
|---|---|
| *C08K 13/02* | (2006.01) |
| *B60C 1/00* | (2006.01) |
| *C08K 5/55* | (2006.01) |
| *C08L 9/00* | (2006.01) |
| *C08K 5/548* | (2006.01) |

(52) U.S. Cl.
CPC . *C08K 13/02* (2013.01); *B60C 1/00* (2013.01); *B60C 1/0016* (2013.04); *B60C 1/0025* (2013.04); *B60C 1/0041* (2013.04); *C08K 5/548* (2013.01); *C08K 5/55* (2013.01); *C08L 9/00* (2013.01); *B60C 2001/005* (2013.04); *B60C 2001/0066* (2013.04)

(58) Field of Classification Search
CPC .......... C08K 5/548; C08K 5/55; C08K 13/02; C08L 9/00; B60C 1/0016; B60C 1/0041; B60C 1/00; B60C 1/00252
See application file for complete search history.

(56) References Cited

U.S. PATENT DOCUMENTS

| | | | |
|---|---|---|---|
| 4,906,680 A | 3/1990 | Umeda et al. | |
| 2010/0036026 A1 | 2/2010 | Hogan et al. | |

FOREIGN PATENT DOCUMENTS

| | | |
|---|---|---|
| JP | 55-029520 A | 3/1980 |
| JP | S63-256635 A | 10/1988 |
| JP | 2009-269977 A | 11/2009 |
| JP | 2010-090361 A | 4/2010 |
| JP | 2010-195855 A | 9/2010 |
| JP | 2013-194109 A | 9/2013 |

OTHER PUBLICATIONS

Derwent Abstract for JP 2009-269977, pp. 1-3.*
Japanese Office Action issued on Jul. 2, 2013 to the corresponding JP Patent Application 2012-223219.

* cited by examiner

*Primary Examiner* — Alexander Kollias
(74) *Attorney, Agent, or Firm* — Carrier Blackman & Associates, P.C.; William D. Blackman; Joseph P. Carrier

(57) ABSTRACT

The present invention provides a rubber composition formed by blending from 1 to 100 parts by mass of carbon black and/or from 5 to 150 parts by mass of an inorganic filler, from 0.5 to 30 parts by mass of a sulfur-containing compounding agent, and from 0.01 to 20 parts by mass of a boron-containing compounding agent into 100 parts by mass of a sulfur-crosslinkable diene rubber, and a pneumatic tire in which the rubber composition is used in at least one type selected from the group consisting of a capped tread, a side wall, a belt, an inner liner, a carcass, and a bead.

12 Claims, 1 Drawing Sheet

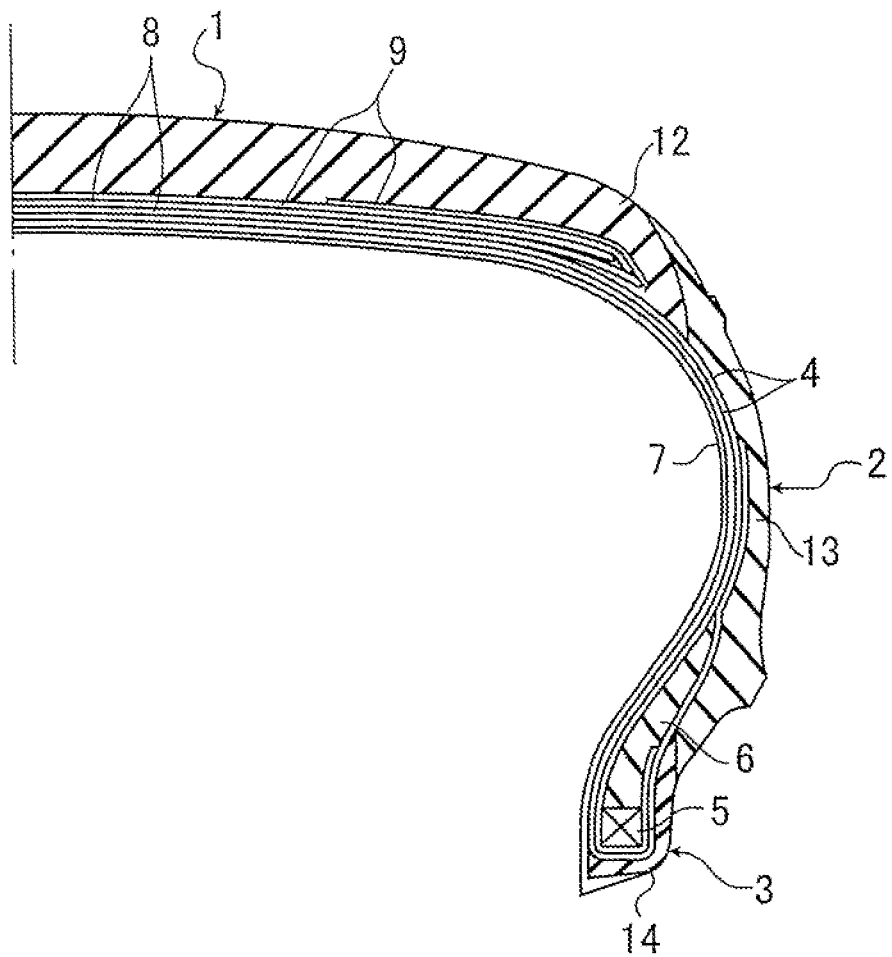

RUBBER COMPOSITION AND PNEUMATIC TIRE USING SAME

TECHNICAL FIELD

The present invention relates to a rubber composition and a pneumatic tire using the same.

BACKGROUND

The effect of increasing the strength of a rubber or the hysteresis loss at the time of repeated deformation by blending a filler (filler material) such as carbon black or silica into a rubber (reinforcing effect) is well known. In a rubber composition for a tire containing a filler, an increase in the strength of the rubber material for the tire leads to an increase in durability or wear resistance. In general, increasing the hysteresis loss makes it possible to improve the wet grip performance and to improve the safety of the vehicle, but at the same time, the roll resistance is increased and the fuel consumption performance is reduced. In this way, tires have contradictory performance factors such as wet grip performance and fuel consumption performance. However, there has been a demand for improvements in the fuel consumption performance of tires due to an increased awareness of energy conservation in recent years. That is, there is a demand to improve fuel consumption performance without sacrificing the wet grip performance of tires.

It has been proposed to blend a triphenylborane-triphenylphosphine complex into a rubber composition for a tire or the like as a vulcanization accelerator (Patent Document 1). However, Patent Document 1 does not relate to a rubber composition for a tire containing a filler. In addition, Patent Document 1 neither discloses nor suggests knowledge for improving fuel consumption performance without sacrificing the wet grip performance of a tire by blending this complex into a rubber composition for a tire containing a filler.

PRIOR ART DOCUMENT

Patent Document

Patent Document 1: Japanese Unexamined Patent Application Publication No. 2009-269977A

SUMMARY OF THE INVENTION

Therefore, an object of the present invention is to provide a rubber composition containing carbon black and/or an inorganic filler capable of imparting excellent wet grip performance and low fuel consumption performance without diminishing workability, and a pneumatic tire using the same.

SUMMARY OF THE INVENTION

As a result of conducting dedicated research in order to solve the problem described above, the present inventors discovered that a rubber composition capable of imparting excellent wet grip performance and low fuel consumption performance without diminishing workability can be obtained by blending from 1 to 100 parts by mass of carbon black and/or from 5 to 150 parts by mass of an inorganic filler, from 0.5 to 30 parts by mass of a sulfur-containing compounding agent, and from 0.01 to 20 parts by mass of a boron-containing compounding agent into 100 parts by mass of a sulfur-crosslinkable diene rubber so as to accelerate the chemical reaction between the sulfur-containing compounding agent and the rubber (for example, a chemical reaction of sulfur and rubber, a sulfur-containing vulcanization accelerator and rubber, or silica, a sulfur-containing silane coupling agent, and rubber; sulfur and rubber produce a crosslinking reaction, a sulfur-containing vulcanization accelerator and rubber produce a crosslinking reaction, a sulfur-containing silane coupling agent and rubber produce a crosslinking reaction, and silica and a sulfur-containing silane coupling agent produce a condensation reaction; same hereinafter), and the present inventors thereby completed the present invention.

That is, the present invention provides the following rubber composition and a pneumatic tire using the same.

(1) A rubber composition formed by blending from 1 to 100 parts by mass of carbon black and/or from 5 to 150 parts by mass of an inorganic filler, from 0.5 to 30 parts by mass of a sulfur-containing compounding agent, and from 0.01 to 20 parts by mass of a boron-containing compounding agent into 100 parts by mass of a sulfur-crosslinkable diene rubber.

(2) The rubber composition according to (1) described above, the boron-containing compounding agent being an organic boron compound; the inorganic filler being silica; the sulfur-containing compounding agent containing at least a sulfur-containing silane coupling agent; the amount of the sulfur-containing silane coupling agent being from 0.5 to 20 parts by mass per 100 parts by mass of the diene rubber; and the organic boron compound being blended at a ratio of from 0.01 to 3 in terms of the molar ratio relative to the sulfur-containing silane coupling agent.

(3) The rubber composition according to (2) described above, the organic boron compound being at least one type of organic boron compound selected from the group consisting of an acid-base adduct of a trivalent phosphorus compound serving as a Lewis base and a boron compound serving as a Lewis acid, an acid-base adduct of a trivalent amine compound serving as a Lewis base and a boron compound serving as a Lewis acid, triarylborane, trialkylborane, arylboronic acid, arylborinic acid, and organic boroxine compounds.

(4) A rubber composition formed by blending:
from 1 to 100 parts by mass of carbon black and/or from 10 to 1.50 parts by mass of an inorganic filler;
from 1 to 30 parts by mass of a sulfur-containing compounding agent; and
from 0.1 to 20 parts by mass of a boron compound represented by the following formula (1), and/or a boron complex having a phosphorus-boron bond, and/or a boron complex having a nitrogen-boron bond into 100 parts by mass of a sulfur-crosslinkable diene rubber.

[Formula 1]

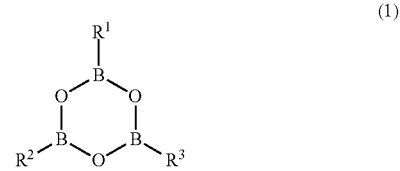

(1)

(In formula (1), $R^1$, $R^2$, and $R^3$ are each independently an optionally substituted hydrocarbon group having from 1 to 20 carbon atoms, a hydroxy group, an alkoxy group having from 1 to 20 carbon atoms, an ester group having from 1 to 20 carbon atoms, an amino group, an amino group having one or two hydrocarbon groups with from 1 to 20 carbon atoms, a halogen, or hydrogen, and $R^1$, $R^2$, and $R^3$ may be the same or different.)

(5) The rubber composition according to (4) described above, the boron complex being at least one type selected from the group consisting of phosphine borane compounds, amine borane compounds, ammonia borane compounds, and amide borane compounds.

(6) The rubber composition according to (4) or (5) described above, the sulfur-containing compounding agent being at least one type selected from the group consisting of sulfur, sulfur-containing silane coupling agents, and sulfur-containing vulcanization accelerators.

(7) The rubber composition according to any one of (4) to (6) described above, the inorganic filler being silica, the sulfur-containing compounding agent containing at least a sulfur-containing silane coupling agent; and the amount of the sulfur-containing silane coupling agent being from 1 to 20 parts by mass per 100 parts by mass of the diene rubber.

(8) The rubber composition according to any one of (4) to (7) described above, the boron complex being at least one type selected from the group consisting of: a compound represented by the following formula (2), a compound represented by formula (3): $R^6{}_a H_{3-a} N—BH_{3-b} R^7{}_b$ (in formula (3), $R^6$ is each independently an optionally substituted aliphatic hydrocarbon group having from 1 to 20 carbon atoms, $R^7$ is each independently an optionally substituted hydrocarbon group, a is an integer from 1 to 3, b is an integer from 0 to 3, $R^6$ may be the same or different when a is 2 or 3, and $R^7$ may be the same or different when b is 2 or 3), and a compound represented by formula (6): $H_3N—BH_{3-b}R^7{}_b$ (in formula (6), $R^7$ is each independently an optionally substituted hydrocarbon group, b is each an integer from 0 to 3, and $R^7$ may be the same or different when b is 2 or 3).

[Formula 2]

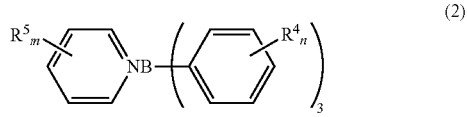

(2)

(In formula (2), $R^4$ and $R^5$ are each independently an optionally substituted hydrocarbon group having from 1 to 20 carbon atoms, a hydroxy group, an alkoxy group having from 1 to 20 carbon atoms, an ester group having from 1 to 20 carbon atoms, an amino group, an amino group having 1 or 2 hydrocarbon groups with from 1 to 20 carbon atoms, or a halogen, m and n are each independently an integer from 0 to 5, $R^4$ may be the same or different when n is a plural number, and $R^5$ may be the same or different when m is a plural number.)

(9) A pneumatic tire in which the rubber composition according to any one of claims 1 to 8 is used in at least one type selected from the group consisting of a capped tread, a side wall, a belt, an inner liner, a carcass, and a bead.

Effect of the Invention

With the present invention, it is possible to provide a rubber composition capable of imparting excellent wet grip performance and low fuel consumption performance without diminishing workability, and a pneumatic tire using the same.

In addition, when a specific boroxine compound, and/or a boron complex having a phosphorus-boron bond, and/or a boron complex having a nitrogen-boron bond is blended into the composition as a boron-containing compounding agent, the rubber composition of the present invention and the pneumatic tire of the present invention demonstrate excellent tensile at break, elongation at break, and modulus.

BRIEF DESCRIPTION OF THE DRAWING

FIG. 1 is a cross-sectional view schematically illustrating a partial cross section in the meridian direction of a tire in an example of an embodiment of the pneumatic tire of the present invention.

BEST MODE FOR CARRYING OUT THE INVENTION

The present invention is described in detail below.
The rubber composition of the present invention is a rubber composition formed by blending:
from 1 to 100 parts by mass of carbon black and/or from 5 to 150 parts by mass of an inorganic filler;
from 0.5 to 30 parts by mass of a sulfur-containing compounding agent; and
from 0.01 to 20 parts by mass of a boron-containing compounding agent into 100 parts by mass of a sulfur-crosslinkable diene rubber.

In the present invention, by blending a sulfur-containing compounding agent and a boron-containing compounding agent into a sulfur-crosslinkable diene rubber, it is possible to accelerate the chemical reaction between the sulfur-containing compounding agent and rubber and to increase the balance between tan δ of low and high temperatures so as to obtain a compound with excellent wet grip performance and low fuel consumption performance without diminishing workability.

The low fuel consumption performance of the tire alone improves when the roll resistance of the tire is smaller. The roll resistance of the tire decreases and the low fuel consumption performance improves when the hysteresis loss is smaller since the energy loss occurring when the rubber constituting the tire repeatedly deforms (hysteresis loss) accounts for approximately 90% of the roll resistance. In addition, rubber is a viscoelastic substance having both the properties of elasticity and viscosity, and the viscosity, in particular, has a strong property of converting kinetic energy at the time of deformation into thermal energy and scattering the energy. Therefore, the heat generation due to the deformation of the rubber is smaller when the hysteresis loss is smaller. tan δ is a parameter of the energy loss converted to heat from when the rubber deforms until it returns to its original shape, and larger values of tan δ indicate larger energy loss due to tire bending and larger roll resistance. In this specification, low fuel consumption is sometimes referred to as low heat generation.

[Diene Rubber]

The diene rubber contained in the rubber composition of the present invention is not particularly limited as long as the rubber is sulfur-crosslinkable. Specific examples include natural rubber (NR), isoprene rubber (IR), butadiene rubber (BR), aromatic vinyl-conjugated diene copolymer rubber, acrylonitrile-butadiene copolymer rubber (NBR), butyl rubber (TIR), butyl halide rubber (Br-TIR, Cl-IIR), and chloroprene rubber (CR).

In the present invention, it is preferable to use an aromatic vinyl-conjugated diene copolymer rubber as the diene rubber in that a tire with excellent wet grip performance can be obtained.

Examples of aromatic vinyl-conjugated diene copolymer rubbers include styrene-butadiene copolymer rubber (SBR) and styrene-isoprene copolymer rubber. Of these, a styrene-butadiene copolymer rubber (SBR) is preferable in that a tire with excellent wet grip performance can be obtained.

The weight average molecular weight of the diene rubber is preferably from 200,000 to 2,500,000 from the perspective of having excellent tensile at break, elongation at break, and modulus as well as excellent workability, low heat generation, and wet grip performance. In the present invention, the weight average molecular weight (Mw) of the diene rubber is measured by gel permeation chromatography (GPC) on the basis of standard polystyrene using tetrahydrofuran as a solvent.

There is no particular limitation on the production of the diene rubber. Examples thereof include conventionally known products. A single diene rubber can be used, or a combination of two or more types can be used.

[Carbon Black]

The carbon black that can be blended into the rubber composition of the present invention is not particularly limited. Examples thereof include conventionally known substances. A single carbon black can be used or a combination of two or more carbon blacks can be used.

In the present invention, the amount of carbon black may be from 1 to 100 parts by mass per 100 parts by mass of the sulfur-crosslinkable diene rubber. The amount of carbon black is preferably from 3 to 90 parts by mass and more preferably from 5 to 80 parts by mass per 100 parts by mass of the diene rubber from the perspective of having excellent tensile at break, elongation at break, and modulus as well as excellent low heat generation, wet grip performance, and workability.

[Inorganic Filler]

The inorganic fillers that can be blended into the rubber composition of the present invention are not particularly limited. Examples include silica, calcium carbonate, clay, and talc. One preferred mode is for the inorganic filler to be silica.

The silica contained in the rubber composition of the present invention is not particularly limited. Any conventionally known silica that is blended into rubber compositions in applications such as tires can be used alone or as a combination of two or more types of silicas.

Examples of silicas include wet silica, dry silica, fumed silica, and diatomaceous earth. The silica preferably contains a wet silica from the perspective of the reinforcement of the rubber.

In the present invention, the nitrogen adsorption specific surface area ($N_2SA$) of the silica is preferably from 20 to 500 $m^2/g$ from the perspective that the effect of the present invention improves further. The nitrogen adsorption specific surface area ($N_2SA$) is a value determined in accordance with JIS K6217-2:2001 "Part 2: How to Determine Specific Surface Area—Nitrogen Adsorption Method and Single Point Method".

In addition, the silica preferably has a cetyltrimethylammonium bromide (CTAB) absorption specific surface area of from 100 to 300 $m^2/g$ and more preferably from 140 to 200 $m^2/g$ from the perspective of having excellent tensile at break, elongation at break, and modulus as well as excellent low heat generation, wet grip performance, and workability.

Here, the CTAB adsorption specific surface area is an alternative characteristic of the surface area that can be utilized by silica for adsorption to the silane coupling agent and is a value determined by measuring the amount of CTAB adsorption to the silica surface in accordance with JIS K 6217-3:2001 "Part 3: How to Determine Specific Surface Area—CTAB Adsorption Method".

The inorganic filler can be used alone or as a combination of two or more types of inorganic fillers.

In the present invention, the content of the inorganic filler can be set to from 5 to 150 parts by mass per 100 parts by mass of the diene rubber. The content is preferably from 10 to 150 parts by mass, more preferably from 20 to 120 parts by mass, and even more preferably from 40 to 100 parts by mass per 100 parts by mass of the diene rubber from the perspective of having excellent tensile at break, elongation at break, and modulus as well as excellent low heat generation, wet grip performance, and workability. When the content exceeds 150 parts by mass, the workability diminishes.

In the present invention, when the inorganic filler is silica, a preferred mode is for the sulfur-containing compounding agent to contain at least a sulfur-containing silane coupling agent from the perspective of having excellent tensile at break, elongation at break, and modulus as well as excellent low heat generation, wet grip performance, and workability. In this case, the content of silica is preferably from 5 to 150 parts by mass, more preferably from 20 to 120 parts by mass, and even more preferably from 40 to 100 parts by mass per 100 parts by mass of the diene rubber from the perspective of having excellent tensile at break, elongation at break, and modulus as well as excellent low heat generation, wet grip performance, and workability. When the content exceeds 150 parts by mass, the workability diminishes.

[Sulfur-Containing Compounding Agent]

The sulfur-containing compounding agent contained in the rubber composition of the present invention is not particularly limited as long as the compound has sulfur atoms. The sulfur-containing compounding agent may be at least one type selected from the group consisting of sulfur, sulfur-containing silane coupling agents, and sulfur-containing vulcanization accelerators, for example.

(Sulfur)

The sulfur is not particularly limited. Examples thereof include conventionally known substances.

(Sulfur-Containing Silane Coupling Agent)

The sulfur-containing silane coupling agent is not particularly limited as long as it is a silane coupling agent having at least one sulfur atom. Examples thereof include polysulfide-based silane coupling agents having polysulfide bonds with at least three sulfur atoms such as bis(3-triethoxysilylpropyl) tetrasulfide and 3-trimethoxysilylpropyl benzothiazole tetrasulfide; disulfide-based silane coupling agents such as bis(3-triethoxysilylpropyl)disulfide; mercapto-based silane coupling agents such as γ-mercaptopropyltriethoxysilane, 3-[ethoxybis(3,6,9,12,15-pentaoxacctacosane-1-yloxy)silyl]-1-propanethiol; thiocarboxylate-based silane coupling agents such as 3-octanoylthiopropyl triethoxysilane; and thiocyanate-based silane coupling agents such as 3-thiocyanatepropyl triethoxysilane.

Of these, a polysulfide-based silane coupling agent having polysulfide bonds with at least two sulfur atoms is preferable, a polysulfide-based silane coupling agent having polysulfide bonds with from 2 to 5 sulfur atoms is more preferable, and bis(3-triethoxysilylpropyl)tetrasulfide or bis(3-triethoxysilylpropyl)disulfide is even more preferable from the perspective of having excellent tensile at break, elongation at break, and modulus as well as excellent low heat generation, wet grip performance, and workability.

Examples of commercially available products include Si69 (manufactured by Evonik Degussa Corp) as bis(3-triethoxysilylpropypropyl)tetrasulfide and Si266 (manufactured by Evonik Degussa Corp) as bis(3-triethoxysilylpropyl)disulfide.

The present inventors discovered that when silica, the sulfur-containing silane coupling agent described below, a specific boroxine compound, and/or a boron complex having a nitrogen-boron bond is used in the diene rubber, it is preferable for the sulfur-containing silane coupling agent to be a polysulfide-based silane coupling agent having polysulfide bonds with at least two sulfur atoms from the perspective of having excellent tensile at break, elongation at break, and modulus as well as excellent low heat generation, wet grip performance, and workability. Here, a polysulfide bond having at least two sulfur atoms is expressed by —(S)x- (X: 2 or greater).

One preferred mode is for the polysulfide bond to have at least two sulfur atoms between two carbon atoms and for at least two sulfur atoms to be bonded directly. Sulfur atoms bonded to carbon atoms are difficult to desulfurize, and sulfur atoms having sulfur atoms bonded to both sides are easy to desulfurize. In the present invention, the present inventors surmise that the loss of catalytic activity of the boron compound and/or boron complex due to the desulfurization of sulfur atoms from the polysulfide-based silane coupling agent (including the desulfurization of sulfur atoms from a polysulfide-based silane coupling agent having at least three sulfur atoms) is suppressed, and the chemical reaction between the sulfur-containing compounding agent and the rubber (for example, the chemical reaction of sulfur and rubber, a sulfur-containing vulcanization accelerator and rubber, or silica, a sulfur-containing silane coupling agent, and rubber) is accelerated so as to yield a product having excellent tensile at break, elongation at break, and modulus as well as excellent low heat generation, wet grip performance, and workability. Of these, when the rubber composition of the present invention contains a sulfur-containing silane coupling agent as a sulfur-containing compounding agent, the chemical reaction of the silica, the sulfur-containing silane coupling agent, and the rubber is particularly accelerated. Specifically, two reactions—the condensation reaction of the silica and the sulfur-containing silane coupling agent and the crosslinking reaction of the sulfur-containing silane coupling agent and the rubber—are accelerated simultaneously with good balance.

(Sulfur-Containing Vulcanization Accelerator)

The sulfur-containing vulcanization accelerator is not particularly limited as long as it is a vulcanization accelerator that has sulfur atoms and can be used in a rubber composition. Here, sulfur-containing vulcanization accelerators are assumed to include sulfur-containing vulcanization acceleration aids. Examples of sulfur-containing vulcanization accelerators include thiuram compounds such as tetramethylthiuram disulfide and tetramethylthiuram monosulfide; dithiocarbamates such as zinc dimethyldithiocarbamate; thiazole compounds such as 2-mercaptobenzothiazole and dibenzothiazyl disulfide; and sulfenamide compounds such as N-cyclohexyl-2-benzothiazole sulfenamide and N-t-butyl-2-benzothiazole sulfenamide.

Of these, N-cyclohexyl-2-benzothiazole sulfenamide and N,N-dicyclohexyl-2-benzothiazolyl sulfenamide are preferable from the perspective of having excellent tensile at break, elongation at break, and modulus as well as excellent low heat generation, wet grip performance, and workability.

The sulfur-containing compounding agent can be used alone or as a combination of two or more types.

(Compounding Ratio of the Sulfur-Containing Compounding Agent)

In the present invention, the amount of the sulfur-containing compounding agent is from 0.5 to 30 parts by mass per 100 parts by mass of the diene rubber. The amount of the sulfur-containing compounding agent is preferably from 1 to 30 parts by mass, more preferably from 1.5 to 25 parts by mass, and even more preferably from 2 to 20 parts by mass per 100 parts by mass of the diene rubber from the perspective of having excellent tensile at break, elongation at break, and modulus as well as excellent low heat generation, wet grip performance, and workability.

The amount of sulfur is preferably from 0.1 to 10 parts by mass per 100 parts by mass of the diene rubber.

The amount of the sulfur-containing vulcanization accelerator is preferably from 0.1 to 10 parts by mass per 100 parts by mass of the diene rubber.

The amount of the sulfur-containing silane coupling agent is preferably from 0.5 to 20 parts by mass, more preferably from 1 to 20 parts by mass, even more preferably from 1 to 15 parts by mass, and even more preferably from 3 to 1.2 parts by mass per 100 parts by mass of the diene rubber from the perspective of having excellent tensile at break, elongation at break, and modulus as well as excellent low heat generation, wet grip performance, and workability. The content is also preferably from 2 to 10 parts by mass.

[Boron Compounding Agent]

In the present invention, a "boron-containing compounding agent" refers to an organic boron compound or a boron compound represented by the following formula (1), and/or a boron complex having a phosphorus-boron bond, and/or a boron complex having a nitrogen-boron bond.

[Formula 3]

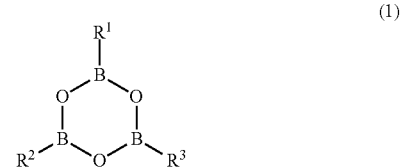

(1)

(In formula (1), $R^1$, $R^2$, and $R^3$ are each independently an optionally substituted hydrocarbon group having from 1 to 20 carbon atoms, a hydroxy group, an alkoxy group having from 1 to 20 carbon atoms, an ester group having from 1 to 20 carbon atoms, an amino group, an amino group having one or two hydrocarbon groups with from 1 to 20 carbon atoms, a halogen, or hydrogen, and $R^1$, $R^2$, and $R^3$ may be the same or different.)

In this specification, the compound represented by the formula (1) above may be called a "specific boroxine compound".

(Organic Boron Compound)

A preferable example of the organic boron compound used in the present invention is at least one type selected from the group consisting of an acid-base adduct of a trivalent phosphorus compound or amine compound serving as a Lewis base and a boron compound serving as a Lewis acid, triarylborane, trialkylborane, arylboronic acid, arylborinic acid, and organic boroxine compounds.

Examples of the acid-base adduct described above include triarylphosphine triarylborane represented by the following formula (11), triarylphosphine borane represented by the following formula (12), and pyridine triarylborane represented by the following formula (13),

[Formula 4]

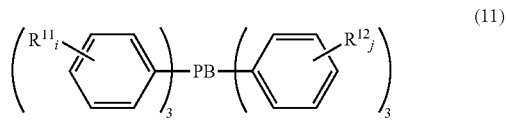

(11)

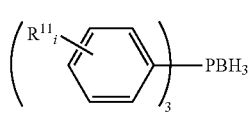

(12)

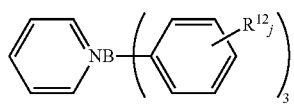

(13)

(In formulas (11), (12), and (13), $R^{11}$ and $R^{12}$ are each independently a hydrogen atom, an optionally substituted hydrocarbon group having from 1 to 18 carbon atoms or an optionally substituted aromatic group having from 6 to 18 carbon atoms; i and j are each independently an integer from 0 to 5; $R^{11}$ may be the same or different when i is a plural number; and $R^{12}$ may be the same or different when j is a plural number.)

Examples of optionally substituted hydrocarbon groups having from 1 to 18 carbon atoms represented by $R^{11}$ and $R^{12}$ include alkyl groups such as methyl, ethyl, propyl, isopropyl, butyl, isobutyl, secondary butyl, tertiary butyl, pentyl, secondary pentyl, tertiary pentyl, hexyl, heptyl, octyl, isooctyl, 2-ethylhexyl, tertiary octyl, nonyl, isononyl, decyl, undecyl, dodecyl, tridecyl, tetradecyl, pentadecyl, hexadecyl, heptadecyl, and octadecyl; hydroxyalkyl groups serving as hydroxyl group substituents of the alkyl groups described above such as hydroxyethyl, 2-hydroxypropyl, and 3-hydroxypropyl; alkoxy groups such as methoxy, ethoxy, propoxy, isopropoxy, butoxy, octoxy, and 2-ethylhexyloxy corresponding to the alkyl groups described above; and alkenyl groups having from 2 to 30 carbon atoms such as vinyl, propenyl, butenyl, and hexenyl. Any —$CH_2$— in the hydrocarbon groups may be substituted with —O—, —CO—, —COO—, or $SiH_2$—, and some or all of the hydrogen atoms may be substituted with halogen atoms such as fluorine atoms, chlorine atoms, bromine atoms, or iodine atoms, cyano groups, —SO2, or the like.

In addition, examples of optionally substituted aromatic groups having from 6 to 18 carbon atoms represented by $R^{11}$ and $R^{12}$ include aryl groups such as phenyl, orthotolyl, 2,3-xylyl, mesityl, 1-naphthyl, and 2-naphthyl. In these aromatic groups, some or all of the hydrogen atoms may be substituted with halogen atoms such as fluorine, chlorine, bromine, or iodine, cyano groups, alkoxy groups, —$SO_2$, or the like.

In addition, the pyridine in formula (13) may be substituted with a primary, secondary, or tertiary amine having a hydrocarbon group with from 1 to 18 carbon atoms, or ammonia.

Examples of hydrocarbon groups having from 1 to 18 carbon atoms include alkyl groups such as methyl, ethyl, propyl, isopropyl, butyl, isobutyl, secondary butyl, tertiary butyl, pentyl, secondary pentyl, tertiary pentyl, hexyl, heptyl, octyl, isooctyl, 2-ethylhexyl, tertiary octyl, nonyl, isononyl, decyl, undecyl, dodecyl, tridecyl, tetradecyl, pentadecyl, hexadecyl, heptadecyl, and octadecyl; hydroxyalkyl groups serving as hydroxyl group substituents of the alkyl groups described above such as hydroxyethyl, 2-hydroxypropyl, and 3-hydroxypropyl; alkoxy groups such as methoxy, ethoxy, propoxy, isopropoxy, butoxy, octoxy, and 2-ethylhexyloxy corresponding to the alkyl groups described above; and alkenyl groups having from 2 to 30 carbon atoms such as vinyl, propenyl, butenyl, and hexenyl. Any —$CH_2$— in the hydrocarbon groups may be substituted with —O—, —CO—, —COO—, or $SiH_2$, and some or all of the hydrogen atoms may be substituted with halogen atoms such as fluorine atoms, chlorine atoms, bromine atoms, or iodine atoms, cyano groups, —$SO_2$, or the like.

An example of the triarylborane described above is borane substituted with an aryl group having from 6 to 18 carbon atoms, and specific examples include triphenylborane, tris (methylphenyl)borane, tris methoxyphenyl)borane, and tri-mesitylborane.

An example of the trialkylborane described above is borane substituted with an alkyl group having from 1 to 18 carbon atoms, and specific examples include trimethylborane, triethylborane, and tributylborane.

An example of the arylboronic acid described above is phenylboronic acid in which the hydroxyl groups of boronic acid are substituted with a single aryl group such as a phenyl group, for example.

An example of the arylboronic acid described above is phenylborinic acid in which the hydroxyl groups of boronic acid are substituted with two aryl groups such as phenyl groups, for example.

An example of the organic boroxine compound described above is the compound represented by the following formula (14).

[Formula 5]

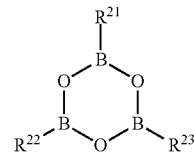

(14)

(In formula (14), $R^{21}$, $R^{22}$, and $R^{23}$ are each independently an optionally substituted hydrocarbon group having from 1 to 20 carbon atoms, a hydroxy group, an alkoxy group having from 1 to 20 carbon atoms, an ester group having from 1 to 20 carbon atoms, an amino group, an amino group having one or two hydrocarbon groups with from 1 to 20 carbon atoms, a halogen, or hydrogen, and $R^{21}$, $R^{22}$, and $R^{23}$ may be the same or different. However, at least one of $R^{21}$, $R^{22}$, and $R^{23}$ is an organic group.)

The compound represented by formula (14) above is preferably 2,4,6-triphenylboroxine, 2,4,6-tris(4-methylphenyl) boroxine, or 2,4,6-tris(4-methoxyphenyl) boroxine.

Of the organic boron compounds described above, triphenylphosphine triphenylborane, triphenylphosphine borane, pyridine triphenylborane, 2,4,6-triphenylboroxine, 2,4,6-tris (4-methylphenyl)boroxine, or 2,4,6-tris(4-methoxyphenyl) boroxine is preferable from the perspective that the effect of the present invention is improved.

When the boron-containing compounding agent blended into the rubber composition of the present invention is the organic boron compound described above, the inorganic filler is silica, and the sulfur-containing compounding agent contains at least a sulfur-containing silane coupling agent, the amount of the sulfur-containing silane coupling agent is preferably from 0.5 to 20 parts by mass per 100 parts by mass of the diene rubber, and it is preferable to blend the organic boron compound into the rubber composition at a ratio of from 0.01 to 3 in terms of the molar ratio with respect to the sulfur-containing silane coupling agent.

The molar ratio of the organic boron compound with respect to the sulfur-containing silane coupling agent is more preferably from 0.01 to 2.5, even more preferably from 0.01 to 2, even more preferably from 0.01 to 1, and even more preferably from 0.05 to 0.55. The effect of the present invention is excellent when the molar ratio is within this range.
(Specific Boroxine Compound and Boron Complex Having a Phosphorus-Boron Bond and/or a Nitrogen-Boron Bond)

In the present invention, by blending a sulfur-containing compounding agent and specific boroxine compound and/or a boron complex having a phosphorus-boron bond and/or a nitrogen-boron bond into a sulfur-crosslinkable diene rubber, the chemical reaction of the sulfur-containing compounding agent and rubber is accelerated and the balance of the tensile at break (TB), elongation at break (EB), modulus, and tan δ balance at low and high temperatures is increased so that a compound having excellent tensile at break, elongation at break, modulus, low heat generation, and wet grip performance can be obtained without diminishing workability.

In the present invention, when the specific boroxine compound is ring-opened as a result of another compounding agent or the like, for example, coming into close proximity of the specific boroxine compound, the boron atoms immediately after ring opening take on a positive charge so that the electrophilicity increases (the specific ring-opened boroxine compound is also thought to function as a Lewis acid), which facilitates interaction with elements having unshared electron pairs such as oxygen or sulfur.

In the present invention, the boron complex having a phosphorus-boron bond and/or a nitrogen-boron bond may be a complex formed from a Lewis base having a phosphorus atom (unshared electron pair) and/or a nitrogen atom (unshared electron pair) (phosphorus-containing compound and/or nitrogen-containing compound) and a Lewis acid containing a boron atom (unoccupied orbit) (boron-containing compound). As a result of the dissociation of the phosphorus-boron bond and/or a nitrogen-boron bond, a trivalent boron-containing compound is produced as a Lewis acid from the boron complex having a phosphorus-boron bond and/or a nitrogen-boron bond. The trivalent boron-containing compound functions as a Lewis acid since it has an unoccupied p-orbit, which facilitates interaction with elements having unshared electron pairs such as oxygen or sulfur.

In addition, in the specific boroxine compound and the boron complex having a phosphorus-boron bond and/or a nitrogen-boron bond, the space in the vicinity of the boron atoms is relatively large with little three-dimensional obstruction, so the complex easily interacts with high periodic elements (with large atomic radii) such as sulfur.

In this way, it is thought that since the specific boroxine compound and the boron complex having a phosphorus-boron bond and/or a nitrogen-boron bond can function as Lewis acids, and since there is little three-dimensional obstruction in the vicinity of the boron atoms, the chemical reaction of the sulfur-containing compounding agent and rubber is efficiently accelerated. As a result, it becomes possible to obtain a rubber with an excellent tensile at break, elongation at break, modulus, low heat generation, and wet grip performance without diminishing workability. The mechanism described above is the conjecture of the present inventors, and even if the mechanism differs from that described above, the mechanism is included in the scope of the present invention.

In the present invention, the specific boroxine compound and the boron complex having a phosphorus-boron bond and/or a nitrogen-boron bond are used as compounding agents of the rubber composition and are not used as catalysts or polymer terminal modifying agents to be used when producing the rubber.

The specific boroxine compounds and boron complexes having a phosphorus-boron bond and/or a nitrogen-boron bond that can be contained in the rubber composition of the present invention will be described hereinafter.

The specific boroxine compound described above is not particularly limited as long as it is a compound represented by formula (1).

[Formula 6]

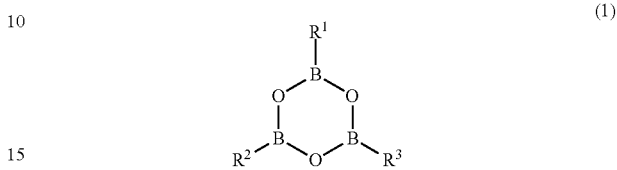

(In formula (1), $R^1$, $R^2$, and $R^3$ are each independently an optionally substituted hydrocarbon group having from 1 to 20 carbon atoms, a hydroxy group, an alkoxy group having from 1 to 20 carbon atoms, an ester group having from 1 to 20 carbon atoms, an amino group, an amino group having one or two hydrocarbon groups with from 1 to 20 carbon atoms, a halogen, or hydrogen, and $R^1$, $R^2$, and $R^3$ may be the same or different.)

Examples of the hydrocarbon group described above include aliphatic hydrocarbon groups which may have unsaturated bonds (alkyl groups, alkenyl groups, or alkynyl groups); alicyclic hydrocarbon groups which may have unsaturated bonds; aromatic hydrocarbon groups having from 6 to 20 carbon atoms (aryl groups); and combinations thereof, and the hydrocarbon group may be a straight-chain or branched-chain group. The hydrocarbon group can contain a hetero atom such as an oxygen atom, a nitrogen atom, or a sulfur atom.

Examples of hydrocarbon groups having from 1 to 20 carbon atoms include alkyl groups such as methyl groups, ethyl groups, n-propyl groups, isopropyl groups, n-butyl groups, iso-butyl groups, sec-butyl groups, tert-butyl groups, pentyl groups, hexyl groups, heptyl groups, 2-ethylhexyl groups, octyl groups, nonyl groups, and decyl groups; alkenyl groups such as vinyl groups, 1-propenyl groups, 2-propenyl groups, 1-butenyl groups, 2-butenyl groups, 1-pentenyl groups, 2-pentenyl groups, 1-hexenyl groups, 2-hexenyl groups, and 1-octenyl groups; alkynyl groups such as ethynyl groups, propynyl groups, butynyl groups, pentynyl groups, hexynyl groups, heptynyl groups, octynyl groups, nonynyl groups, decinyl groups, undecinyl groups, and dodecinyl groups; and aryl groups having from 6 to 20 carbon atoms such as phenyl groups, tolyl groups, xylyl groups, naphthyl groups, and biphenyl groups.

Examples of substituents that the hydrocarbon group may have include hydroxy groups (—OH groups), alkoxy groups (same as those described above) or acyl groups having from 1 to 20 carbon atoms, amino groups (—$NH_2$ groups), —NHR groups (where R is a hydrocarbon group having from 1 to 20 carbon atoms, and hydrocarbon groups having from 1 to 20 carbon atoms are the same as those described above), —NRR' groups (where R and R' are each independently a hydrocarbon group having from 1 to 20 carbon atoms, and hydrocarbon groups having from 1 to 20 carbon atoms are the same as those described above), and halogens (for example, —F, —Cl, —Br, and —I).

The amino groups serving as $R^1$, $R^2$, and $R^3$ having one or two alkoxy groups, ester groups, or hydrocarbon groups may have substituents. The substituents are the same as those described above.

Examples of alkoxy groups having from 1 to 20 carbon atoms include methoxy groups, ethoxy groups, propoxy groups, octyloxy groups, decyloxy groups, and dodecyloxy groups.

The ester having from 1 to 20 carbon atoms is not particularly limited as long as it is an ester having a hydrocarbon group with from 1 to 20 carbon atoms. Examples thereof include alkyl esters such as methyl esters, ethyl esters, propyl esters, octyl esters, decyl esters, and dodecyl esters; and aromatic esters such as phenyl esters.

The amino group having one or two hydrocarbon groups with from 1 to 20 carbon atoms (R—NH— (imino group) or RR'—N—, where R and R' are each independently a hydrocarbon group having from 1 to 20 carbon atoms, and hydrocarbon groups having from 1 to 20 carbon atoms are the same as described above) is not particularly limited. Examples thereof include alkylimino groups such as methylimino, ethylimino, propylimino, octylimino, decylimino, and dodecylimino groups; aromatic imino groups such as phenylimino groups; and dialkylamino groups such as dimethylamino and diethylamino groups.

Examples of halogens include —F, —Cl, —Br, and —I.

Examples of compounds that can constitute the specific boroxine compound described above include boronic acid (substance in which one hydroxy group of orthoboric acid is substituted with a hydrocarbon group, including carbon-boron bonds; the hydrocarbon group is optionally substituted and may have from 1 to 20 carbon atoms; the hydrocarbon groups and substituents having from 1 to 20 carbon atoms are the same as those described above), orthoboric acid, or a compound in which one hydroxy group of orthoboric acid is substituted with an alkoxy group having from 1 to 20 carbon atoms, an ester group having from 1 to 20 carbon atoms, an amino group, an amino group having one or two hydrocarbon groups with from 1 to 20 carbon atoms, a halogen, or hydrogen.

One preferred mode of the specific boroxine compound described above is a trimer of boronic acid (boronic anhydride). The boronic acid constituting the specific boroxine compound described above may be one type or two or more types of boronic acids.

Examples of the specific boroxine compound described above include boronic anhydrides comprising a boronic acid having an optionally substituted aromatic hydrocarbon group (a single type of boronic acid) such as phenylboronic acid anhydride (trimer of phenylboronic acid; same hereinafter], also called "2,4,6-triphenylboroxine"), p-methyl-phenylboronic acid anhydride (also called "2,4,6-tris(4-methylphenyl) boroxine"), p-methoxy-phenylboronic acid anhydride (also called "2,4,6-tris(4-fluorophenyl)boroxine"); p-trifluoromethyl-phenylboronic acid anhydride (also called "2,4,6-tris (4-trifluoromethylphenyl) boroxine"), and p-fluoro-phenylboronic acid anhydride (also called "2,4,6-tris(4-fluorophenyl)boroxine"); and boronic anhydrides comprising at least two boronic acids having optionally substituted aromatic hydrocarbon groups selected from the group consisting of phenylboronic acid, p-methyl-phenylboronic acid, p-methoxyphenylboronic acid, p-trifluoromethyl-phenylboronic acid, and p-fluoro-phenylboronic acid.

In the present invention, the boron complex having a phosphorus-boron bond and/or a nitrogen-boron bond is not particularly limited as long as the complex is formed by the direct bonding of phosphorus and boron and/or nitrogen and boron. The P-boron complex (called a boron complex having a phosphorus-boron bond; same hereinafter) and/or the N-boron complex (called a boron complex having a nitrogen-boron bond; same hereinafter) may be a complex formed from a Lewis base having a phosphorus compound (unshared electron pair) and/or a nitrogen atom (unshared electron pair) (nitrogen-containing compound) and a Lewis acid having a boron atom (unoccupied orbit) (boron-containing compound).

The P-boron complex and/or N-boron complex described above is preferably at least one type selected from the group consisting of phosphine borane compounds, amine borane compounds, ammonia borane compounds, and amide borane compounds from the perspective of having excellent tensile at break, elongation at break, and modulus as well as excellent low heat generation, wet grip performance, and workability.

The phosphine borane compounds and/or amine borane compounds described above may be exemplified by a compound formed by a combination of a phosphine and/or an amine having an aliphatic hydrocarbon group and/or an aromatic hydrocarbon group, a nitrogen-containing heterocyclic compound, or an amine having a combination of these structures and a boron-containing compound.

Examples of a nitrogen-containing heterocyclic compound-borane compound formed by a combination of a nitrogen-containing heterocyclic compound and a boron-containing compound include pyridine borane compounds (for example, a compound represented by the following formula (2)), pyrrole borane compounds, and quinoline borane compounds.

[Formula 7]

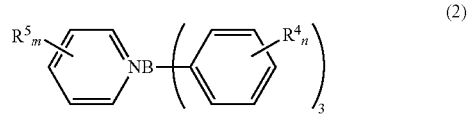

(2)

(In formula (2), $R^4$ and $R^5$ are each independently an optionally substituted hydrocarbon group having from 1 to 20 carbon atoms, a hydroxy group, an alkoxy group having from 1 to 20 carbon atoms, an ester group having from 1 to 20 carbon atoms, an amino group, an amino group having 1 or 2 hydrocarbon groups with from 1 to 20 carbon atoms, or a halogen, m and n are each independently an integer from 0 to 5, $R^4$ may be the same or different when n is a plural number, and $R^5$ may be the same or different when m is a plural number.)

The optionally substituted hydrocarbon groups having from 1 to 20 carbon atoms, alkoxy groups having from 1 to 20 carbon atoms, ester groups having from 1 to 20 carbon atoms, amino groups, amino groups having one or two hydrocarbon groups with from 1 to 20 carbon atoms, and halogens are the same as those described above.

Examples of a nitrogen-containing heterocyclic compound-borane compound include pyridine compounds (for example, pyridine, picoline, lutidine, and dimethylamino pyridine) and compounds formed by a combination of a nitrogen-containing heterocyclic compound such as a pyrrole or quinoline and a boron-containing compound.

Specific examples of a nitrogen-containing heterocyclic compound-borane compound include pyridine borane compounds such as pyridine triphenylborane (m=n=0 in formula (2)), picoline triphenylborane, lutidine triphenylborane, and dimethylamino pyridine triphenylborane; and quinoline borane compounds such as quinoline triphenylborane.

Examples of aliphatic amine-borane compounds formed by a combination of an amine having an aliphatic hydrocarbon group and a boron-containing compound include compounds represented by formula (3): $R^6_a H_{3-a} N$—$BH_{3-b} R^7_b$ (in formula (3), $R^6$ is each independently an optionally substituted aliphatic hydrocarbon group having from 1 to 20 carbon atoms, $R^7$ is each independently an optionally substituted hydrocarbon group, a is an integer from 1 to 3, b is an integer from 0 to 3, $R^6$ may be the same or different when a is 2 or 3, and $R^7$ may be the same or different when b is 2 or 3.)

Aliphatic hydrocarbon groups having from 1 to 20 carbon atoms and the substituents that the aliphatic hydrocarbon groups may have are the same as those described above. As described above, the aliphatic hydrocarbon group having from 1 to 20 carbon atoms may have unsaturated bonds.

The number of carbon atoms of the optionally substituted hydrocarbon group is preferably from 1 to 20, and the optionally substituted hydrocarbon groups having from 1 to 20 carbon atoms are the same as those described above.

Examples of aliphatic amine-borane compounds include alkylamine borane compounds (including compounds in which borane atoms are unsubstituted or have substituents) such as dimethylamino borane ($HMe_2N$—$BH_3$), triethylamine triphenylborane ($Et_3N$—$BPh_3$), and (n-octadecyl) amine borane.

Examples of ammonia borane compounds formed by a combination of ammonia and a boron-containing compound include compounds represented by formula (6): $H_3N$—$BH_{3-b}R^7_b$ (in formula (6), $R^7$ is each independently an optionally substituted hydrocarbon group, b is each an integer from 0 to 3, and $R^7$ may be the same or different when b is 2 or 3.)

The number of carbon atoms of the optionally substituted hydrocarbon group is preferably from 1 to 20, and the optionally substituted hydrocarbon groups having from 1 to 20 carbon atoms are the same as those described above.

Examples of ammonia borane compounds include ammonia borane compounds in which nitrogen atoms are not substituted (including compounds in which borane atoms are unsubstituted or have substituents) such as $H_3N$—$BH_3$, $H_3N$—$BPh_3$ (Ph refers to a phenyl group having substituents or not having substituents).

The amide borane compound formed by a combination of an amide and a boron-containing compound is not particularly limited as long as it is a compound formed by a combination of a compound having an amide bond (N—CO) and a boron-containing compound. An example thereof is a compound represented by the following formula (7).

[Formula 8]

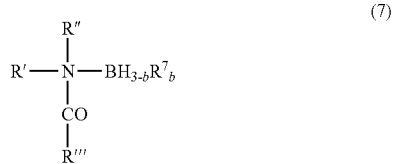

(7)

In formula (7), R', R", and R''' are each independently a hydrogen atom or an optionally substituted hydrocarbon group, FR is each independently an optionally substituted hydrocarbon group, b is each an integer from 0 to 3, and $R^7$ may be the same or different when b is 2 or 3.

The number of carbon atoms of the optionally substituted hydrocarbon group is preferably from 1 to 20, and the optionally substituted hydrocarbon groups having from 1 to 20 carbon atoms are the same as those described above.

The N-boron complex described above is preferably at least one type selected from the group consisting of a compound represented by formula (2), a compound represented by formula (3), and a compound represented by formula (6) from the perspective of having excellent tensile at break, elongation at break, and modulus as well as excellent low heat generation, wet grip performance, and workability.

The nitrogen-containing compound that can be used to form the N-boron complex described above (Lewis base having a nitrogen atom [unshared electron pair] [nitrogen-containing compound]) is not particularly limited as long as it is an amine (for example, an amine having an aliphatic hydrocarbon group and/or an aromatic hydrocarbon group and a nitrogen-containing heterocyclic compound, or a compound combining these structures), ammonia, or amide (for example, an amide having an aliphatic hydrocarbon group and/or an aromatic hydrocarbon group).

An example of the nitrogen-containing heterocyclic compound described above is a compound represented by the following formula (4) (wherein $R^5$ and m are the same as those in formula (2)), and specific examples are pyridine, picoline, lutidine, or pyridine derivatives such as N-dimethylamino pyridine (pyridine compounds).

[Formula 9]

(4)

Examples of the aromatic compound described above include aniline and aniline derivatives such as N,N-dimethylaniline.

An example of the aliphatic amine compound described above is a compound represented by $R^6_aH_{3-a}N$ (wherein $R^6$ and a are the same as those in formula (3)), and specific examples include trialkylamines such as triethylamine; dialkylamines such as dimethylamine; and monoalkylamines such as methylamine.

An example of the amide described above is an amide compound. represented by formula (8) R'R"—N—CO—R''' (R', R", and R''' are the same as those in formula (7)), and a specific example is N,N-dimethylformamide.

The boron-containing compound that can be used to form the N-boron complex is not particularly limited as long as it is a compound having a boron atom. An example thereof is a compound represented by $BH_{3-b}R^7_b$. In the formula, $R^7$ is each independently an optionally substituted hydrocarbon group, b is an integer from 0 to 3, and R may be the same or different when b is 2 or 3. The number of carbon atoms of the optionally substituted hydrocarbon group is preferably from 1 to 20, and the optionally substituted hydrocarbon groups having from 1 to 20 carbon atoms are the same as those described above. Specific examples thereof include a compound represented by the following formula (5) and trihydroborane.

[Formula 10]

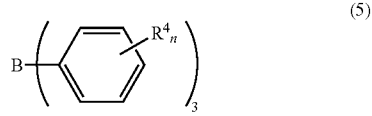

(5)

(In formula (5), $R^4$ is an optionally substituted hydrocarbon group having from 1 to 20 carbon atoms, n is an integer from 0 to 5, and $R^4$ may be the same or different when n is a plural number.)

The optionally substituted hydrocarbon groups having from 1 to 20 carbon atoms are the same as those described above. In addition, the boron-containing compound may be trihydroborane $BH_3$.

The production methods of the specific boroxine compound and N-boron complex described above are not particularly limited. Examples thereof include conventionally known production methods. The specific boroxine compound and N-boron complex described above may each be used alone or as a combination of two or more types.

The amount of the specific boroxine compound and/or N-boron complex described above (the total amount when both the specific boroxine compound and N-boron complex described above are used in combination) is preferably from 0.1 to 20 parts by mass and more preferably from 0.3 to 10 parts by mass per 100 parts by mass of the diene rubber from the perspective of having excellent tensile at break, elongation at break, and modulus as well as excellent low heat generation, wet grip performance, and workability.

In the present invention, when the boron-containing compounding agent described above is the boron compound represented by formula (1) above and/or the boron complex having a nitrogen-boron bond described above, setting the amount of the inorganic filler so as to be from 10 to 150 parts by mass, the amount of the sulfur-containing compounding agent so as to be from 1 to 30 parts by mass, and the amount of the boron-containing compounding agent so as to be from 0.1 to 20 parts by mass per 100 parts by mass of the diene rubber makes it possible to obtain a rubber composition with a high tensile at break (TB), elongation at break (EB), and modulus as well as a highly balanced tan δ at low and high temperatures (excellent tensile at break, elongation at break, modulus, low heat generation, and wet grip performance) without diminishing workability.

Further, it is preferable for the inorganic filler to be silica, for the sulfur-containing compounding agent to contain at least a sulfur-containing silane coupling agent, and for the amount of the sulfur-containing silane coupling agent to be from 1 to 20 parts by mass per 100 parts by mass of the diene rubber.

[Silane Coupling Agent not Containing Sulfur]

The rubber composition of the present invention may further contain a silane coupling agent that does not contain sulfur.

In addition, in the present invention, when the inorganic filler is silica, one preferred mode is for the rubber composition of the present invention to further contain a silane coupling agent that does not contain sulfur.

The silane coupling agent that does not contain sulfur is not particularly limited. Examples thereof include aminosilane coupling agents, epoxysilane coupling agents, and hydroxysilane coupling agents.

The amount of the silane coupling agent that does not contain sulfur is preferably from 1 to 15 parts by mass and more preferably from 3 to 12 parts by mass per 100 parts by mass of the diene rubber from the perspective of having excellent tensile at break, elongation at break, and modulus as well as excellent low heat generation, wet grip performance, and workability.

[Other Additives]

The rubber composition of the present invention may further contain additives as necessary within a scope that does not inhibit the effect or purpose thereof.

Examples of additives include various additives typically used in rubber compositions such as zinc oxide, stearic acid, antiaging agents, processing aids, aroma oils, liquid polymers, terpene-based resins, thermosetting resins, vulcanizing agents other than sulfur, vulcanizing accelerators not having sulfur atoms, and vulcanizing accelerator aids contained in the rubber composition of the present invention.

In Japanese Unexamined Patent Application Publication No. 2009-269977A (Patent Document 1) cited as a prior art document, a triphenylborane-triphenylphosphine complex is used as a vulcanization accelerator. However, according to the research of the present inventors, practically no vulcanization acceleration effect is observed when this vulcanization accelerator is added, and since an organic boron compound is used in the present invention for the purpose of improving the condensation reaction between silica and the silane coupling agent and the crosslinking reaction between the rubber and the silane coupling agent, it is preferable to blend the vulcanization accelerator into the composition separately.

[Production of the Rubber Composition]

The production method of the rubber composition of the present invention is not particularly limited. A specific example is a method of mixing and kneading each of the components described above using a known method and apparatus (for example, a Banbury mixer, a kneader, a roller, or the like).

In addition, the rubber composition of the present invention can be vulcanized or crosslinked under conventional, publicly known vulcanizing or crosslinking conditions.

The rubber composition of the present invention can be used, for example, in a tire, a belt, a hose, or the like.

[Pneumatic Tire]

The pneumatic tire of the present invention will be described hereinafter.

The pneumatic tire of the present invention is a pneumatic tire in which the rubber composition of the present invention is used for at least one type selected from the group consisting of a cap tread, a side wall, a belt, an inner liner, a carcass, and a bead. The rubber composition used in the present invention is not particularly limited as long as it is the rubber composition of the present invention. The at least one type selected from the group consisting of a cap tread, a side wall, a belt, an inner liner, a carcass, and a bead of the pneumatic tire of the present invention is produced using the rubber composition of the present invention.

The rubber composition for a tire according to the present invention has a substantial effect of reducing the roll resistance of a tire and is therefore particularly useful for a tread (a cap tread, in particular).

The pneumatic tire of the present invention will be described hereinafter with reference to the attached drawings. The pneumatic tire of the present invention is not limited to the accompanying drawings.

FIG. 1 is a cross-sectional view schematically illustrating a partial cross-section in the meridian direction of a tire in an example of an embodiment of the pneumatic tire of the present invention. In FIG. 1, reference numeral 1 is a cap tread, reference numeral 2 is a side wall, and reference numeral 3 is a bead.

In FIG. 1, two layers of a carcass 4, formed by arranging reinforcing cords extending in a tire circumferential direction in a tire circumferential direction at a predetermined pitch and embedding these reinforcing cords in a rubber layer, are disposed extending between left and right beads 3. Both ends are made to sandwich a bead filler 6 around a bead core 5 that is embedded in the beads 3 and are folded back in a tire axial direction from the inside to the outside. An inner liner 7 is disposed inward of the carcass 4. Two layers of a belt 8, formed by arranging reinforcing cords extending inclined to the tire circumferential direction in the tire axial direction at a predetermined pitch and embedding these reinforcing cords in a rubber layer, are disposed on an outer circumferential side of the carcass 4 of the cap tread 1. The reinforcing cords of the two layers of the belt 8 cross interlaminarly so that the incline directions with respect to the tire circumferential direction are opposite each other. A belt cover 9 is disposed on the outer circumferential side of the belt 8. The cap tread 1 is formed from a cap tread rubber layer 12 on the outer circumferential side of the belt cover 9. A side rubber layer 13 is disposed outward of the carcass 4 of each side wall 2, and a rim cushion rubber layer 14 is provided outward of the portion of the carcass 4 that is folded back around each of the beads 3.

At least one type selected from the group consisting of the cap tread 1, the side wall 2, the belt 8, the inner liner 7, the carcass 4, and the beads 3 is formed from the rubber composition of the present invention.

The pneumatic tire of the present invention is not particularly limited with the exception that the rubber composition of the present invention is used for a pneumatic tire, and, for example, the tire can be produced in accordance with a conventionally known method. In addition to ordinary air or air with an adjusted oxygen partial pressure, inert gasses such as nitrogen, argon, and helium can be used as the gas with which the tire is filled.

WORKING EXAMPLES

The present invention will be described in detail hereinafter using working examples. The present invention is not limited to such working examples.

<Production of Unvulcanized Rubber Composition>

According to the formulation (parts by mass) shown in Table 1, the components excluding the vulcanization components (vulcanization accelerator and sulfur) were kneaded for five minutes in a 1.7 liter sealed Banbury Mixer. The composition was then discharged from the mixer and cooled to room temperature. Next, an unvulcanized rubber composition was obtained by placing the rubber composition on an open roll, adding the vulcanization components, and kneading the mixture.

<Production of Vulcanized Rubber>

Next, the unvulcanized rubber composition obtained as described was press-vulcanized for 20 minutes at 160° C. in a prescribed die to prepare a vulcanized rubber test piece.

<Evaluation>

The characteristics of the unvulcanized rubber composition and the vulcanized rubber test piece obtained as described above were measured with the test methods illustrated below.

[tan δ (0° C.), tan δ (50° C.), and tan δ (60° C.)]

The value of tan δ was measured for the vulcanized rubber test piece using a viscoelastic spectrometer (manufactured by Iwamoto Seisakusho) under conditions with an elongation deformation distortion factor of 10±2%, a vibration frequency of 20 Hz, and a temperature of 0° C., 50° C., or 60° C.

The results express the values of tan δ measured at 0° C., 50° C., or 60° C. as tan δ (0° C.), tan δ (50° C.), and tan δ (60° C.), respectively, and the results are shown as an index in Table 1 using the value of Comparative Example 1 as 100.

tan δ (0° C.) is an index of wet grip performance, and a larger index indicates superior wet grip performance.

tan δ (50° C.) and tan δ (60° C.) are indices of heat generation, and smaller indices indicate lower heat generation, smaller roll resistance, and superior low fuel consumption.

[Mooney Viscosity]

The Mooney viscosity ML (1+4) of the unvulcanized rubber composition at 100° C. was determined using an L-shaped rotor in accordance with JIS K 6300-1:2001. The results are shown as indices in Table 1 using the value of Comparative Example 1 as 100.

The Mooney viscosity is an index of workability, and a smaller index indicates that the viscosity of the unvulcanized rubber composition is lower and that the workability is superior.

[Mooney Scorch]

The amount of time (min) required for the viscosity of the unvulcanized rubber composition to increase by 5 points at 125° C. was measured in accordance with JIS K 6300-1:2001. The results are shown as indices in Table 1 using the value of Comparative Example 1 as 100.

The Mooney scorch is an index of workability, and a larger index indicates that the viscosity of the unvulcanized rubber composition less likely to increase and that the workability is superior.

[M100, TB, and EB]

A No. JIS3 dumbbell-shaped test piece was punched out from the vulcanized rubber test piece, and a tensile test was performed at a tension speed of 500 mm/min in accordance with JIS K 6251:2004. The 100% modulus (M100), the tensile at break (TB), and the elongation at break (EB) of the vulcanized rubber test piece were measured at room temperature. The results are shown as indices in Table 1 using the value of Comparative Example 1 as 100

Larger indices of M100, TB, and EB indicate a superior modulus, tensile at break, and elongation at break.

TABLE 1

|  |  | Comparative Example | | |
|---|---|---|---|---|
|  |  | 1 | 2 | 3 |
| Formulation (parts by mass) | SBR | 100 | 100 | 100 |
|  | Boron complex 1 | — | — | — |
|  | Boron complex 2 | — | — | — |
|  | Boron complex 3 | — | — | — |
|  | Boron compound 1 | — | — | — |
|  | Boron compound 2 | — | — | — |
|  | Boron compound 3 | — | — | — |
|  | Triphenylphosphine | — | 1 | — |
|  | Sodium borate | — | — | 1 |
|  | Silica | 50 | 50 | 50 |
|  | Carbon black | 5 | 5 | 5 |
|  | Zinc oxide | 3 | 3 | 3 |
|  | Stearic acid | 1 | 1 | 1 |

TABLE 1-continued

|  |  |  |  |  |
|---|---|---|---|---|
| Antiaging agent | 1 | 1 | 1 |  |
| Silane coupling agent | 4 | 4 | 4 |  |
| Oil | 6 | 6 | 6 |  |
| Sulfur | 2 | 2 | 2 |  |
| Vulcanization accelerator (CZ) | 1 | 1 | 1 |  |
| Vulcanization accelerator (DPG) | 0.5 | 0.5 | 0.5 |  |
| Molar ratio*1 | — | — | — |  |
| Physical properties (index) tanδ (0° C.) | 100 | 99 | 101 |  |
| tanδ (60° C.) | 100 | 104 | 96 |  |
| tanδ (50° C.) | 100 | — | — |  |
| Mooney viscosity | 100 | 99 | 105 |  |
| Mooney scorch | 100 | — | — |  |
| M100 | 100 | — | — |  |
| TB | 100 | — | — |  |
| EB | 100 | — | — |  |

|  |  | WORKING EXAMPLES |  |  |  |  |  |
|---|---|---|---|---|---|---|---|
|  |  | 1 | 2 | 3 | 4 | 5 | 6 |
| Formulation (parts by mass) | SBR | 100 | 100 | 100 | 100 | 100 | 100 |
|  | Boron complex 1 | 0.04 | 1 | 2 | 8 | — | — |
|  | Boron complex 2 | — | — | — | — | 0.5 | — |
|  | Boron complex 3 | — | — | — | — | — | 0.5 |
|  | Boron compound 1 | — | — | — | — | — | — |
|  | Boron compound 2 | — | — | — | — | — | — |
|  | Boron compound 3 | — | — | — | — | — | — |
|  | Triphenylphosphine | — | — | — | — | — | — |
|  | Sodium borate | — | — | — | — | — | — |
|  | Silica | 50 | 50 | 50 | 50 | 50 | 50 |
|  | Carbon black | 5 | 5 | 5 | 5 | 5 | 5 |
|  | Zinc oxide | 3 | 3 | 3 | 3 | 3 | 3 |
|  | Stearic acid | 1 | 1 | 1 | 1 | 1 | 1 |
|  | Antiaging agent | 1 | 1 | 1 | 1 | 1 | 1 |
|  | Silane coupling agent | 4 | 4 | 4 | 4 | 4 | 4 |
|  | Oil | 6 | 6 | 6 | 6 | 6 | 6 |
|  | Sulfur | 2 | 2 | 2 | 2 | 2 | 2 |
|  | Vulcanization accelerator (CZ) | 1 | 1 | 1 | 1 | 1 | 1 |
|  | Vulcanization accelerator (DPG) | 0.5 | 0.5 | 0.5 | 0.5 | 0.5 | 0.5 |
|  | Molar ratio*1 | 0.01 | 0.27 | 0.53 | 2.1 | 0.24 | 0.21 |
| Physical properties (index) | tanδ (0° C.) | 106 | 110 | 110 | 111 | 111 | 110 |
|  | tanδ (60° C.) | 96 | 84 | 76 | 72 | 79 | 87 |
|  | tanδ (50° C.) | — | — | — | — | — | 86 |
|  | Mooney viscosity | 100 | 101 | 104 | 113 | 111 | 102 |
|  | Mooney scorch | — | 110 | — | — | — | 108 |
|  | M100 | — | 90 | — | — | — | 109 |
|  | TB | — | 89 | — | — | — | 110 |
|  | EB | — | 93 | — | — | — | 107 |

|  |  | WORKING EXAMPLES |  |  |  |  |  |
|---|---|---|---|---|---|---|---|
|  |  | 7 | 8 | 9 | 10 | 11 | 12 |
| Formulation (parts by mass) | SBR | 100 | 100 | 100 | 100 | 100 | 100 |
|  | Boron complex 1 | — | — | — | — | — | — |
|  | Boron complex 2 | — | — | — | — | — | — |
|  | Boron complex 3 | — | — | — | — | — | — |
|  | Boron compound 1 | 0.1 | 0.5 | — | — | — | — |
|  | Boron compound 2 | — | — | 0.1 | 0.6 | — | — |
|  | Boron compound 3 | — | — | — | — | 0.1 | 0.7 |
|  | Triphenylphosphine | — | — | — | — | — | — |
|  | Sodium borate | — | — | — | — | — | — |
|  | Silica | 50 | 50 | 50 | 50 | 50 | 50 |
|  | Carbon black | 5 | 5 | 5 | 5 | 5 | 5 |
|  | Zinc oxide | 3 | 3 | 3 | 3 | 3 | 3 |
|  | Stearic acid | 1 | 1 | 1 | 1 | 1 | 1 |
|  | Antiaging agent | 1 | 1 | 1 | 1 | 1 | 1 |
|  | Silane coupling agent | 4 | 4 | 4 | 4 | 4 | 4 |
|  | Oil | 6 | 6 | 6 | 6 | 6 | 6 |
|  | Sulfur | 2 | 2 | 2 | 2 | 2 | 2 |

TABLE 1-continued

|  |  |  |  |  |  |  |  |
|---|---|---|---|---|---|---|---|
|  | Vulcanization accelerator (CZ) | 1 | 1 | 1 | 1 | 1 | 1 |
|  | Vulcanization accelerator (DPG) | 0.5 | 0.5 | 0.5 | 0.5 | 0.5 | 0.5 |
|  | Molar ratio*[1] | 0.04 | 0.22 | 0.04 | 0.23 | 0.03 | 0.23 |
| Physical properties (index) | tanδ (0° C.) | 107 | 110 | 108 | 113 | 108 | 110 |
|  | tanδ (60° C.) | — | — | — | — | — | — |
|  | tanδ (50° C.) | 93 | 89 | 94 | 86 | 92 | 88 |
|  | Mooney viscosity | 103 | 105 | 102 | 102 | 102 | 104 |
|  | Mooney scorch | 109 | 118 | 114 | 132 | 112 | 121 |
|  | M100 | 106 | 110 | 107 | 110 | 110 | 107 |
|  | TB | 104 | 118 | 103 | 107 | 118 | 109 |
|  | EB | 106 | 114 | 106 | 104 | 115 | 107 |

*[1] molar ratio of the boron complex or boron compound with respect to the silane coupling agent.

The details of each of the components shown in Table 1 are as follows.

SBR: Nipol 1502 (emulsion polymerization SBR), produced by Nippon ZEON Co., Ltd.

Boron complex 1: triphenylphosphine triphenylborane (MW: 504.41, CAS NO.: 3053-68-7), produced by Tokyo Chemical Industry Co., Ltd.

Boron complex 2: triphenylphosphine borane (MW: 276.12, CAS NO.: 2049-55-0), produced by Tokyo Chemical Industry Co., Ltd.

Boron complex 3: pyridine triphenylborane (MW: 321.22, CAS NO.: 971-66-4), produced by Hokko Chemical Industry Co., Ltd.

Boron compound 1: 2,4,6-triphenylboroxine (phenylboronic acid anhydride, MW: 311.74, CAS NO.: 3262-89-3), produced by Hokko Chemical Industry Co., Ltd.

Boron compound 2: 2,4,6-tris(4-methylphenyl) boroxine (4-methylphenylboronic acid anhydride, MW: 353.83, CAS NO.: 5084-80-0), produced by Hokko Chemical Industry Co., Ltd.

Boron compound 3: 2,4,6-tris(4-methoxyphenyl)boroxine (4-methoxyphenylboronic acid anhydride, MW: 401.82, CAS NO.: 7294-51-1), produced by Hokko Chemical Industry Co., Ltd.

Triphenylphosphine: triphenylphosphine (CAS NO.: 603-35-0), produced by Tokyo Chemical Industry Co., Ltd.

Sodium borate: sodium tetraborate decahydrate (CAS NO.: 1303-96-4), produced by Wako Pure Chemical Industries, Ltd.

Silica: Nipsil AQ (wet silica, CTAB adsorption specific surface area: 170 m$^2$/g), produced by Japan Silica Corporation.

Carbon black: Showblack N339M (HAF grade carbon black, nitrogen adsorption specific surface area: 81 m$^2$/g, iodine adsorption: 91 mg/g, DBP absorption: 122 cm$^3$/100 g), produced by Showa Cabot Co., Ltd.

Zinc oxide: zinc oxide No. 3, produced by Seido Chemical Industry Co., Ltd.

Stearic acid: stearic acid, produced by Nippon Oil & Fats Co., Ltd.

Antiaging agent 1: Antigen® 6C(S-13), produced by Sumitomo Chemical Co., Ltd.

Silane coupling agent: Si69® (bis[3-(triethoxysilyl)propyl]tetrasulfide, CAS NO.: 40372-72-3), produced by Evonik Degussa Corp.

Oil: Extract No. 4S, produced by Showa Shell Sekiyu K.K.

Sulfur: oil treatment sulfur: produced by Karuizawa Refinery Ltd.

Vulcanization accelerator (CZ): Sanceler-CM-PO (N-cyclohexyl-2-benzothiazolyl sulphenamide, CAS NO.: 95-33-3), produced by Sanshin Chemical Co., Ltd.

Vulcanization accelerator (DPG): Sanceler-D-G (N,N'-diphenylguanidine, CAS NO.: 102-06-7), produced by Sanshin Chemical Co., Ltd.

As is clear from the results shown in Table 1, the rubber compositions prepared in Working Examples 1 to 12 contained from 1 to 100 parts by mass of carbon black and/or from 5 to 150 parts by mass of an inorganic filler, from 0.5 to 30 parts by mass of a sulfur-containing compounding agent, and from 0.01 to 20 parts by mass of a boron-containing compounding agent per 100 parts by mass of the sulfur-crosslinkable diene rubber, so the chemical reaction between the sulfur-containing compounding agent and the rubber was accelerated in comparison to Comparative Example 1 serving as a typical conventional example, and the dispersibility of the carbon black and/or the inorganic filler with respect to the rubber was improved, which made it possible to provide excellent wet grip performance and low fuel consumption. In addition, the workability was also at a level, that was not problematic from the standpoint of production.

Comparative Example 2 is an example in which phosphine was blended into the composition without using an organic boron compound, so no improvement in wet grip performance was observed, and the heat generation was diminished.

Comparative Example 3 is an example in which a sodium borate hydrate was blended into the composition without using an organic boron compound, so no improvement in wet grip performance was observed.

In addition, as is clear from the results shown in Table 1, the rubber compositions prepared in Working Examples 6 to 12 contained from 1 to 100 parts by mass of carbon black and/or from 10 to 150 parts by mass of an inorganic filler, from 1 to 30 parts by mass of a sulfur-containing compounding agent, and from 0.01 to 20 parts by mass of a specific boroxine compound and/or a boron complex having a nitrogen-boron bond per 100 parts by mass of the diene rubber, so the rubber compositions demonstrated superior tensile at break, elongation at break, and modulus in comparison to Comparative Example 1 in which the boron-containing compounding agent was a blank, and the compositions also demonstrated excellent low heat generation and wet grip performance without diminishing workability.

On the other hand, Working Example 2 contained a triphenylphosphine-triphenylborane complex as a boron complex compound having a bond other than a nitrogen-boron bond, so the tensile at break, elongation at break, and modulus decreased in comparison to Comparative Example 1.

The reason that Working Examples 6 to 12 demonstrated excellent tensile at break, elongation at break, and modulus is thought to be that since Working Examples 6 to 12 contained sulfur and sulfur-containing vulcanization accelerators as sulfur-containing compounding agents, the chemical reactions between sulfur and the rubber and between the sulfur-containing vulcanization accelerators and the rubber were accelerated. In addition, the reason that Working Examples 6 to 12 also demonstrated excellent low heat generation and wet grip performance is thought to be that since Working Examples 6 to 12 contained sulfur-containing silane coupling agents as sulfur-containing compounding agents, the chemical reactions between the silica, the sulfur-containing silane coupling agents, and the rubber were accelerated.

REFERENCE NUMERALS

1 Cap tread
2 Side walls
3 Bead
4 Carcass
7 Inner liner
8 Belt

What is claimed is:
1. A rubber composition comprising:
a sulfur-crosslinkable diene rubber:
from 1 to 100 parts by mass of carbon black and/or from 5 to 150 parts by mass of an inorganic filler;
from 0.5 to 30 parts by mass of a sulfur-containing compounding agent; and
from 0.01 to 20 parts by mass of a boron compound and/or a boron complex based on 100 parts by mass of the sulfur-crosslinkable diene rubber,
wherein the boron compound is represented by Formula (1):

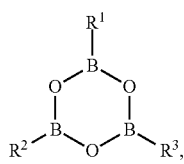

where $R^1$, $R^2$, and $R^3$ are each independently an optionally substituted
hydrocarbon group having from 1 to 20 carbon atoms, a hydroxy group, an alkoxy group having from 1 to 20 carbon atoms, an ester group having from 1 to 20 carbon atoms, an amino group, an amino group having one or two hydrocarbon groups with from 1 to 20 carbon atoms, a halogen, or hydrogen; and
$R^1$, $R^2$, and $R^3$ may be the same or different;
the boron complex is at least one compound selected from the group consisting of Formula (2), Formula (3), and Formula (6);
Formula (2) is given by:

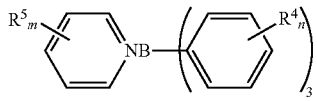

where:
$R^4$ and $R^5$ are each independently an optionally substituted hydrocarbon group having from 1 to 20 carbon atoms, a hydroxy group, an alkoxy group having from 1 to 20 carbon atoms, an ester group having from 1 to 20 carbon atoms, an amino group, an amino group having 1 or 2 hydrocarbon groups with from 1 to 20 carbon atoms, or a halogen;
m and n are each independently an integer from 0 to 5;
$R^4$ may be the same or different when n is a plural number; and
$R^5$ may be the same or different when m is a number greater than 1, Formula (3) is given by:

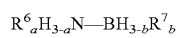

where:
each $R^6$ is independently an optionally substituted aliphatic hydrocarbon group having from 1 to 20 carbon atoms;
$R^7$ is each independently an optionally substituted hydrocarbon group; a is an integer from 1 to 3; and b is an integer from 0 to 3;
$R^6$ may be the same or different when a is 2 or 3; and
$R^7$ may be the same or different when b is 2 or 3;
and Formula (6) is given by:

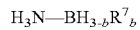

where:
each $R^7$ is independently an optionally substituted hydrocarbon group; and
b is an integer from 0 to 3; and
$R^7$ may be the same or different when b is 2 or 3.
2. The rubber composition according to claim 1, wherein:
the inorganic filler is silica; and
the sulfur-containing compounding agent comprises at least a sulfur-containing silane coupling agent in an amount from 0.5 to 20 parts by mass per 100 parts by mass of the diene rubber; and a ratio of the boron compound and/or boron complex to sulfur-containing silane coupling agent is from 0.01:1 to 3:1.
3. The rubber composition according to claim 1, wherein said sulfur containing compounding agent being at least one selected from the group consisting of sulfur, sulfur-containing silane coupling agents, and sulfur-containing vulcanization accelerators.
4. The rubber composition according to claim 1, wherein:
said inorganic filler is silica;
said sulfur-containing compounding agent containing at least a sulfur-containing silane coupling agent; and
the amount of the sulfur-containing silane coupling agent is from 1 to 20 parts by mass per 100 parts by mass of the sulfur crosslinkable diene rubber.
5. The rubber composition according to claim 1, wherein:
the amount of the inorganic filler is from 10 to 150 parts by mass;
the amount of the sulfur-containing compounding agent is from 1 to 30 parts by mass; and
the amount of the boron compound and/or complex is from 0.1 to 20 parts by mass per 100 parts by mass of the sulfur crosslinkable diene rubber.
6. The rubber composition according to claim 5, wherein the sulfur-containing compounding agent is at least one selected from the group consisting of sulfur, sulfur-containing silane coupling agents, and sulfur-containing vulcanization accelerators.
7. The rubber composition according to 5, wherein:
the inorganic filler is silica;
the sulfur-containing compounding agent comprises at least a sulfur-containing silane coupling agent; and
the amount of the sulfur-containing silane coupling agent is from 1 to 20 parts by mass per 100 parts by mass of the sulfur crosslinkable diene rubber.

8. A pneumatic tire comprising at least one of a capped tread, a side wall, a belt, an inner liner, a carcass, or a bead formed from the rubber composition of claim 1.

9. A pneumatic tire comprising at least one of a capped tread, a side wall, a belt, an inner liner, a carcass, or a bead formed from the rubber composition of claim 2.

10. A pneumatic tire comprising at least one of a capped tread, a side wall, a belt, an inner liner, a carcass, or a bead formed from the rubber composition of claim 5.

11. A pneumatic tire comprising at least one of a capped tread, a side wall, a belt, an inner liner, a carcass, or a bead formed from the rubber composition of claim 6.

12. A pneumatic tire comprising at least one of a capped tread, a side wall, a belt, an inner liner, a carcass, or a bead formed from the rubber composition of claim 7.

* * * * *